United States Patent

Cook

Patent Number: 6,016,220
Date of Patent: Jan. 18, 2000

[54] OFF-AXIS THREE-MIRROR ANASTIGMAT HAVING CORRECTOR MIRROR

[75] Inventor: Lacy G. Cook, El Segundo, Calif.

[73] Assignee: Raytheon Company, Lexington, Mass.

[21] Appl. No.: 08/629,714

[22] Filed: Apr. 9, 1996

Related U.S. Application Data

[62] Division of application No. 08/551,361, Nov. 1, 1995, Pat. No. 5,550,672.

[51] Int. Cl.[7] .............................. G02B 5/10; G02B 13/14; G02B 17/06
[52] U.S. Cl. .......................... 359/351; 359/355; 359/365; 359/366; 359/729; 359/731; 359/859; 359/861
[58] Field of Search ..................................... 359/364, 365, 359/366, 727, 729, 730, 731, 858, 859, 861, 351, 355

[56] References Cited

U.S. PATENT DOCUMENTS

| | | | |
|---|---|---|---|
| 3,811,749 | 5/1974 | Abel | 359/365 |
| 4,226,501 | 10/1980 | Shafer | 359/366 |
| 4,563,064 | 1/1986 | Garas . | |
| 4,598,981 | 7/1986 | Hallam et al. | 359/366 |
| 4,733,955 | 3/1988 | Cook | 359/859 |
| 4,804,258 | 2/1989 | Kebo | 359/366 |
| 5,063,586 | 11/1991 | Jewell et al. | 359/859 |
| 5,144,476 | 9/1992 | Kebo | 359/859 |
| 5,153,772 | 10/1992 | Kathman et al. | 359/365 |
| 5,173,801 | 12/1992 | Cook | 359/861 |
| 5,331,470 | 7/1994 | Cook | 359/861 |
| 5,379,157 | 1/1995 | Wang | 359/861 |
| 5,550,672 | 8/1996 | Cook | 359/861 |

*Primary Examiner*—Ricky D. Shafer
*Attorney, Agent, or Firm*—Colin M. Raufer; Leonard A. Alkov; Glenn H. Lenzen, Jr.

[57] ABSTRACT

A corrector mirror folds the optical path between the objective and relay portions of a three-mirror anastigmat. The corrector mirror is a non-powered mirror having a nominally flat but higher order aspheric surface. By placing the corrector mirror between the objective portion and an intermediate image formed by the objective portion, the field offset of the anastigmat can be significantly increased. A large field offset makes the off-axis anastigmat ideal for use with an on-axis dewar for infrared imaging applications.

19 Claims, 1 Drawing Sheet

OFF-AXIS THREE-MIRROR ANASTIGMAT HAVING CORRECTOR MIRROR

This is a division of application Ser. No. 08/551,361 filed Nov. 1, 1995, now U.S. Pat. No. 5,550,672.

BACKGROUND OF THE INVENTION

This invention relates in general to all-reflective optical systems and in particular to an off-axis three-mirror anastigmat.

Reflective optical systems have long been the champion of the astronomical community, primarily because of their size, lightweight construction and broad spectral coverage. Slowly gaining popularity in other communities, reflective optical systems are now beginning to challenge the established refractive optical systems.

In general, reflective optical systems provide superior performance over refractive optical systems. Reflective optical systems provide superior thermal stability and radiation resistance, and they offer lower image defects arising from chromatic aberration (unlike reflective elements, refractive elements focus different wavelengths of radiation at different focal points).

For certain applications, reflective optical systems can be made far more compact than refractive systems. Reflective systems can operate on a wider range of wavelengths than can refractive optics. A reflective optical systems can operate on both visible and infrared radiation. In contrast, an all-refractive system can operate on visible light or it can operate on infrared radiation, but it cannot operate on both visible and infrared radiation. Thus, an all-reflective surveillance camera would require only a single set of optics for viewing visible and infrared radiation, whereas an all-refractive camera would require two sets of optics: one set for viewing visible radiation, and the other set for viewing infrared radiation. The size and weight savings are impressive and obvious; the elimination of boresight issues is equally impressive, but less obvious.

One type of all-reflective system having a wide range of applications is a three-mirror anastigmat (TMA). The TMA is a re-imaging system, having an objective portion that forms an intermediate image and a relay portion that relays the intermediate image to a plane for viewing. The TMA permits correction of the three fundamental types of geometric aberrations: spherical aberration, coma and astigmatism (three mirrors being the minimum number of elements required for correction of these aberrations in the absence of certain symmetry conditions). The TMA can also be designed to correct for curvature of the field of view.

One such TMA 2 is shown in FIG. 1. The TMA 2 includes a primary mirror 3, a secondary mirror 4, and a tertiary mirror 5. The primary mirror 3 receives optical signals through an entrance pupil 6 and forms an intermediate image 7, which is between the primary mirror 3 and the secondary mirror 4. The secondary mirror 4 and tertiary mirror 5 cooperate to relay the intermediate image through an exit pupil 8 to a focal plane 9 for viewing. This TMA 2 is disclosed in Cook U.S. Pat. No. 4,834,517, issued on May 30, 1989 and assigned to Hughes Aircraft Company, the assignee of this invention. Cook U.S. Pat. No. 4,834,517 is incorporated herein by reference.

The off-axis TMA 2 covers wide fields of view on a flat focal surface at fast optical speeds (optical speed, denoted by an f/number, is proportional to the amount of light collected by the optical system, and it can be calculated as the angle of the F-cone or equivalently as the focal length of the optical system divided by the entrance pupil diameter). For tactical infrared imaging, the off-axis nature of the TMA 2 yields an unobscured aperture, and the relayed nature allows stray radiation to be rejected. The relayed nature of the TMA 2 also allows for 100 percent cold shielding, which is critical for modern tactical infrared detectors.

In addition to the above beneficial characteristics, the TMA 2 has an additional characteristic that can be valued quite highly. Due to the significant angle at which the imaging F-cones intercept the focal plane 9, the TMA 2 can be designed to preclude the reflection of radiation back to its source. This overcomes a problem known as signature augmentation, which is apparent to anyone who has taken a photograph of a person with a camera having its flash bulb mounted directly above the camera's lens: the person in the picture appears to have "red eyes." Signature augmentation occurs because the retina absorbs all but red light from the bulb, and reflects the red light back to the camera lens and onto the film. If the TMA 2 is operated at a small incidence angle, it too will reflect light back to the light source. In certain wide-field applications, this can have serious consequences.

It is apparent from FIG. 1 that the elimination of signature augmentation requires the imaging F-cones to be everywhere outside the normal of the focal plane 9. This necessarily offsets the exit pupil 8 from the focal plane 9, thereby requiring an off-axis cryo-dewar to be built. For those applications where the presence of signature augmentation is of no concern, the cost of the off-axis dewar presents a hardship.

The TMA 2 could accommodate an on-axis dewar (where the cold shield aperture is directly over the focal plane array) if the field of view were offset signficantly. However, such a large field offset would not allow the correction of image aberrations and distortion to the levels generally required for most applications.

SUMMARY OF THE INVENTION

Solutions to the problems above are provided by a three-mirror anastigmat comprising an objective portion operative to form an intermediate image; a corrector mirror, disposed in an optical path between the objective portion and the intermediate image; and a relay portion for relaying the intermediate image. For those applications where the augmentation signature is not a concern, and where an on-axis dewar is greatly desired, the addition of the corrector mirror improves upon the optical form shown in FIG. 1. The corrector mirror allows the field of view to be offset sufficiently, providing substantially on-axis F-cones, while still allowing for the desired correction of image aberrations and distortion.

DETAILED DESCRIPTION OF THE INVENTION

Figure 2:
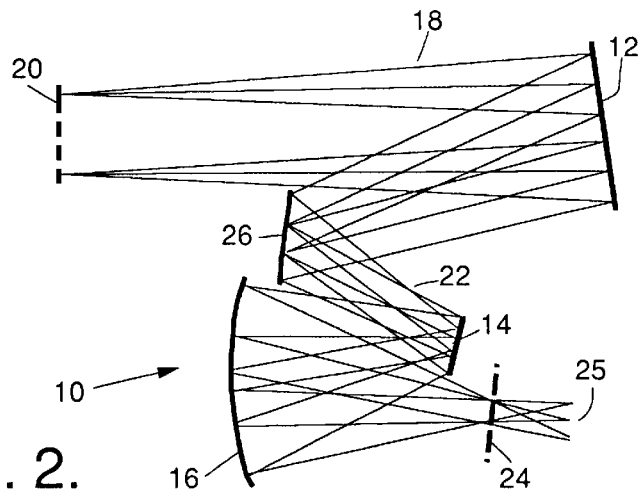
FIG. 2 illustrates a ray-trace section of a three-mirror anastigmat according to this invention.

FIG. 2 illustrates a TMA 10 including a primary mirror 12, secondary mirror 14 and tertiary mirror 16, all disposed substantially about a common axis C. The primary mirror 12 receives optical signals 18 through an entrance pupil 20 and forms an intermediate image 22. The secondary and tertiary mirrors 14 and 16 cooperate to relay the intermediate image 22 through an exit pupil 24 to a focal plane 25 for viewing.

The TMA 10 also includes a corrector mirror 26, a nominally flat mirror, for folding the optical path between the primary and secondary mirrors 12 and 14. The corrector mirror is located between the primary mirror 12 and the intermediate image 22. The corrector mirror 26 allows the field offset to be increased, allowing the TMA 10 to be operated further off axis than the TMA 2 of FIG. 1. While increasing the field offset, the corrector mirror 26 does not degrade the performance of the TMA 10; wide field of view, image quality and distortion correction are maintained.

From this equation, a prescription for the TMA 10 can be generated. One such prescription is shown in the Tables below. The TMA prescribed in the Table has excellent image quality and distortion correction over a 6×8 degree field of view at a speed of f/4. It must be stressed, however, that the prescription in Tables I and II is merely exemplary, and that the prescription of each TMA is determined by the intended application. Therefore, TMAs for different applications will have different prescriptions.

TABLE I

| Surface | Radius | κ | D | E | F | G | Thickness |
|---|---|---|---|---|---|---|---|
| Entrance Pupil 20 | ∞ | — | — | — | — | — | 5.404 |
| Primary Mirror 12 | −8.881 | −0.95795 | −0.32653 × 10$^{-4}$ | 0.97780 × 10$^{-5}$ | −0.62631 × 10$^{-6}$ | 0.18665 × 10$^{7}$ | −3.604 |
| Corrector Mirror 26 | −18.808 | — | 0.15005 × 10$^{-1}$ | −0.43172 × 10$^{-2}$ | 0.80245 × 10$^{-3}$ | −0.64804 × 10$^{-4}$ | 1.869 |
| Second Mirror 14 | 2.758 | 1.6575 | 0.41085 × 10$^{-1}$ | −0.72084 × 10$^{-1}$ | 0.21828 | 0.23068 | −2.330 |
| Tertiary Mirror 16 | 3.244 | −0.05388 | 0.28958 × 10$^{-3}$ | 0.54620 × 10$^{-4}$ | −0.30259 × 10$^{-5}$ | 0.11991 × 10$^{-5}$ | 2.853 |
| Exit Pupil 24 | ∞ | — | — | — | — | — | 0.836 |
| Focal Plane 25 | ∞ | — | — | — | — | — | — |

The power distribution of the primary, secondary and tertiary mirrors 12, 14 and 16 is positive, negative, and positive. The corrector mirror 26 is preferably non-powered, but could have a slight positive or negative power, and it could have a higher order aspheric figure. The precise powers of the mirrors 12, 14, 16 and 26 are selected such that the sum of the powers is zero. A zero sum provides correction of the Petzval sum, causing a zero curvature in the focal plane (i.e., a substantially flat field condition).

The cross-section of the primary mirror 12 can be conic (e.g., paraboloid, hyperboloid or ellipsoid) or a higher order aspheric. The cross-section of the secondary mirror 14 is typically hyperboloid, but can also be a higher order aspheric. The cross-section of the tertiary mirror 16 is typically ellipsoid, but can also be a higher order aspheric. The corrector mirror 26, though nominally flat, is generally provided with an aspheric surface. The aspheric surface also allows the corrector mirror 26 to reduce aberrations in the pupil imagery. These geometries are left up to the discretion of the optical designer.

The mirrors 12, 14, 16 and 26 can be designed on a computer with a ray-tracing software package. Sag (z) of each of the mirrors 12, 14, 16 and 26 can be determined by the following equation, which is an industry standard:

$$z = \frac{C\rho^2}{1 + \sqrt{1 - (\kappa + 1)C^2\rho^2}} + D\rho^4 + E\rho^6 + F\rho^8 + G\rho^{10}$$

where
C=1/radius;
D, E, F and G are constants;
$\rho^2$ is the radial distance on the mirror; and
κ is a conic constant=−(eccentricity)$^2$.

(+) Radii have centers to the right;
(+) Thicknesses are to the right;
(+) Tilts are counterclockwise; and
(+) Decenters are up and are performed before tilts.

TABLE II

| Effective focal length, inch | 3.60 |
|---|---|
| Entrance aperture diameter, inch | 0.90 |
| F-number | F/4.0 |
| Field of view, deg | |
| Elevation | 6.0 |
| Azimuth | 8.0 |
| Entrance aperture offset, inch | 2.107 |
| Field of view offset, deg | 7.5 |

Composition of the mirrors 12, 14, 16 and 26 is dependent upon the application for which the TMA 10 is intended. For wavelengths in the visible spectrum, the mirrors 12, 14, 16 and 26 can be made of materials such as glass, metal, plastic or advanced composite. For wavelengths in the infrared spectrum, the mirrors 12, 14, 16 and 26 can be made of materials such as glass, plastic, metal or advanced composite. The method of fabricating the mirrors 12, 14, 16 and 26 is dependent upon the composition. Fabrication processes include conventional polishing, computer-controlled polishing, precision machining, replication and molding.

When being assembled, the mirrors 12, 14, 16 and 26 can be aligned by being bolted together (typically for precision-machined mirrors) or snapped together (typically for plastics). The method of alignment is dependent upon the composition of the mirrors 12, 14, 16 and 26, the method of their fabrication, and the intended application.

Thus disclosed is a compact, re-imaging all-reflective optical system that is especially suited for wide field of view applications (either line fields for scanning systems or two-dimensional fields for staring systems) where the focal cones for the center of the field must be substantially normally incident on the focal plane 24.

Figure 3:
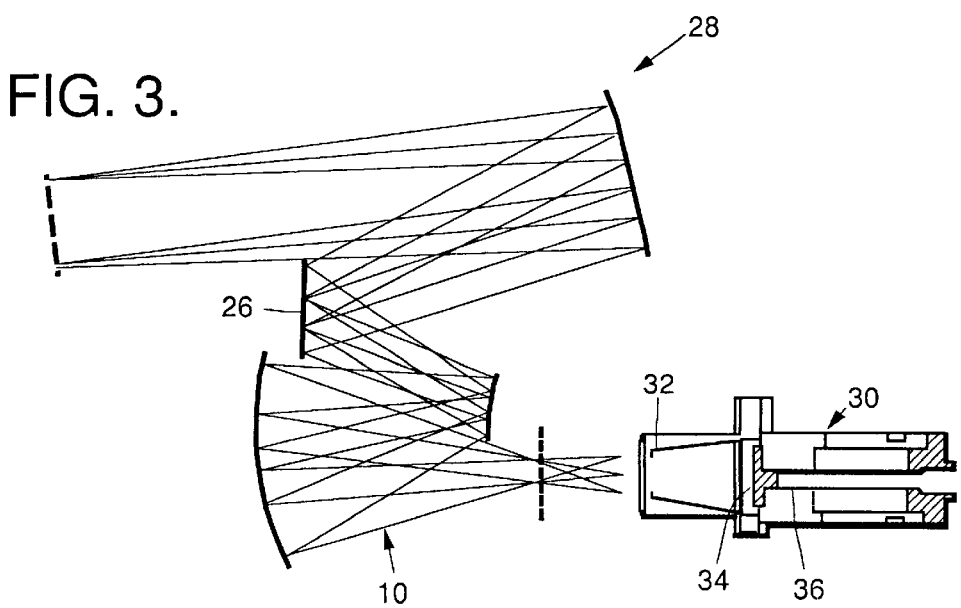
FIG. 3 illustrates an infrared detection system employing the three-mirror anastigmat of FIG. 2.

FIG. 3 shows an infrared imaging system 28 which takes advantage of the off-axis operation of the TMA 10. The system 28 includes the TMA 10 and an on-axis dewar 30 having a cold shield 32 centered directly above a detector array 34. A cold finger 36 forms a thermal connection between the detector array 34 and a cryogenic source (not shown). The corrector mirror 26 of the TMA 10 does not have detrimental packaging effects and can even allow more favorable configurations in some instances.

The TMA 10 of the infrared imaging system 28 can be provided with a field stop (not shown) located between the primary and secondary mirrors 12 and 14 to permit passage of the intermediate image, while blocking the passage of substantially all stray electromagnetic radiation outside of the field of view. Failure to block this stray radiation could result in high levels of noise and spurious signals which degrade the ability of the detector array 34 to detect infrared radiation.

Figure 1:
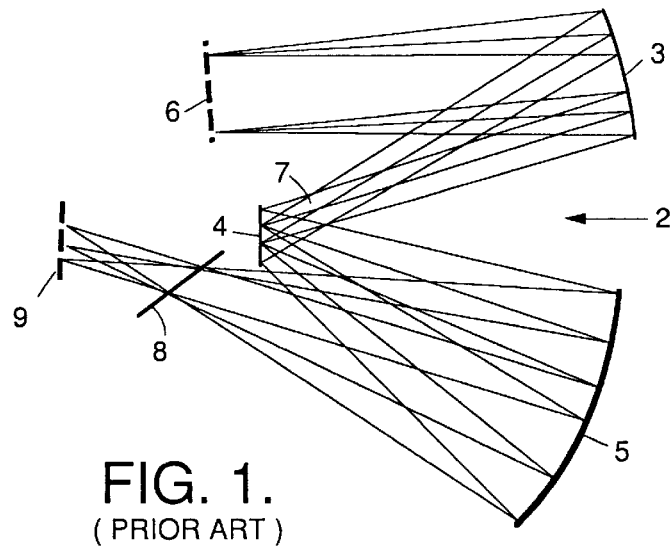
FIG. 1 illustrates a ray-trace section of a three-mirror anastigmat according to the prior art.

It should be noted that the TMA 2 of FIG. 1 cannot be used with an on-axis dewar 30 because the dewar 30 would interfere with the incoming light. Therefore, the only other feasible combination would be on-axis TMA (e.g., TMA 2) with an off-axis dewar. However, the on-axis nature of dewar 32, that is, the cold shield 32 being centered directly above the detector 34, makes the on-axis dewar 30 less complex and, therefore, more desirable than the off-axis dewar, whose cold shield is not centered directly above the detector array.

It will be understood that the embodiments described herein are merely exemplary and that a person skilled in the art may make many variations and modifications without departing from the spirit and scope of the invention. For example, a corrector mirror could be placed between the secondary mirror and intermediate image of the three mirror anastigmat disclosed in Cook U.S. Pat. No. 4,265,510. All such modifications are intended to be included within the scope of the invention as defined in the appended claims.

I claim:

1. An infrared imaging system comprising:
   an on-axis dewar having an infrared detector; and
   an off-axis anastigmat for focusing infrared radiation on the detector, the anastigmat having a primary mirror, a corrector mirror, a secondary mirror and a tertiary mirror in serial arrangement along an optical path, the primary mirror forming an intermediate image that is relayed by the secondary mirror and the tertiary mirror.

2. The system of claim 1 wherein the corrector mirror has an aspheric surface.

3. The system of claim 1 wherein the primary mirror is operative to form the intermediate image along the optical path, the corrector mirror is operative to fold the optical path between the primary mirror and the secondary mirror, and the secondary and tertiary mirrors are operative to relay the intermediate image to a final image.

4. The system of claim 1 wherein said primary minor has a concave reflecting surface yielding significant net positive optical power, said primary mirror being operable to create a subsequent intermediate image.

5. The system of claim 1 wherein said secondary mirror has a convex reflecting surface yielding significant net negative optical power.

6. The system of claim 1 wherein said tertiary mirror has a concave reflective surface yielding significant net positive optical power.

7. The system of claim 1 further comprising a final image surface that is substantially flat and located subsequent to said tertiary mirror and is optically conjugate to the intermediate image between said primary and secondary mirrors by the operation of said secondary and tertiary mirrors.

8. The system of claim 1 wherein said primary, secondary, and tertiary mirrors have conic section configurations.

9. The system of claim 1 wherein said on-axis dewar further comprises a real unobscured entrance pupil prior to said primary mirror.

10. The system of claim 1 further comprising a final image surface that is substantially flat and located subsequent to said tertiary mirror and is optically conjugate to the intermediate image between said primary and secondary mirrors by the operation of said secondary and tertiary mirrors.

11. The system of claim 10 further comprising a real unobscured exit pupil positioned between said tertiary mirror and said final image surface and optically conjugate to an entrance pupil by the operation of said primary, corrector, secondary, and tertiary mirrors.

12. The system of claim 11 wherein said exit pupil is substantially centered on said final image surface such that an imaging f-cone at the center of said image is substantially perpendicular to said image surface.

13. An infrared imaging system comprising:
   an on-axis dewar having an infrared detector, wherein said on-axis dewar further comprises a real unobscured entrance pupil prior to said primary mirror; and
   an off-axis anastigmat for focusing infrared radiation on the detector, the anastigmat having a primary mirror, a corrector mirror, a secondary mirror and a tertiary mirror in serial arrangement along an optical path.

14. An infrared imaging system comprising:
   an on-axis dewar having an infrared detector;
   an off-axis anastigmat for focusing infrared radiation on the detector, the anastigmat having a primary mirror, a corrector mirror, a secondary mirror and a tertiary mirror in serial arrangement along an optical path;
   a final image surface that is substantially flat and located subsequent to said tertiary mirror and is optically conjugate to an intermediate image between said primary and secondary mirrors by the operation of said secondary and tertiary mirrors; and
   a real unobscured exit pupil positioned between said tertiary mirror and said final image surface and optically conjugate to an entrance pupil by the operation of said primary, corrector, secondary, and tertiary mirrors.

15. The system of claim 14 wherein said exit pupil is substantially centered on said final image surface such that an imaging f-cone at the center of said image is substantially perpendicular to said image surface.

16. An infrared imaging system comprising:
   a dewar having an infrared detector;
   a three-mirror anastigmat for focusing infrared radiation on the detector, the anastigmat having exactly three mirrors including a primary mirror, a secondary mirror, and a tertiary mirror in serial arrangement along an optical path; and
   a corrector mirror positioned in the optical path between the primary mirror and the secondary mirror, the primary mirror forming an intermediate image that is relayed by the secondary mirror and the tertiary mirror.

17. The system of claim 16, wherein the dewar is an on-axis dewar.

18. An infrared imaging system comprising:
   a dewar having an infrared detector; and an off-axis anastigmat for focusing infrared radiation on the detector, the anastigmat having a primary mirror, a corrector mirror, a secondary mirror and a tertiary mirror in serial arrangement along an optical path, wherein at least one of the primary mirror, the secondary mirror, and the tertiary mirror has a shape selected from the group consisting of a conic section configuration and a general aspheric configuration, the primary mirror forming an intermediate image that is relayed by the secondary mirror and the tertiary mirror.

19. The system of claim 18, wherein the dewar is an on-axis dewar.

* * * * *